(12) United States Patent
Shah

(10) Patent No.: US 12,197,711 B2
(45) Date of Patent: *Jan. 14, 2025

(54) CROSS-PLATFORM COMPUTING SKILL EXECUTION

(71) Applicant: Microsoft Technology Licensing, LLC, Redmond, WA (US)

(72) Inventor: Shrey Nitin Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/190,440

(22) Filed: Mar. 27, 2023

(65) Prior Publication Data
US 2023/0305685 A1 Sep. 28, 2023

Related U.S. Application Data

(63) Continuation of application No. 17/028,108, filed on Sep. 22, 2020, now Pat. No. 11,635,881.

(51) Int. Cl.
*G06F 3/048* (2013.01)
*G06F 3/04842* (2022.01)
*H04L 67/306* (2022.01)

(52) U.S. Cl.
CPC ........ *G06F 3/04842* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,537,664 B2 | 1/2017 | Ramaswamy | |
| 10,277,601 B1* | 4/2019 | Higgins | .............. G06F 21/6218 |
| 2004/0049670 A1 | 3/2004 | Miyamoto | |
| 2009/0319768 A1 | 12/2009 | Ezaki | |

(Continued)

FOREIGN PATENT DOCUMENTS

WO 2010126831 A1 11/2010

OTHER PUBLICATIONS

"Non Final Office Action Issued in U.S. Appl. No. 17/706,356", Mailed Date: Jun. 7, 2023, 17 Pages.

(Continued)

*Primary Examiner* — Thanh T Vu

(57) ABSTRACT

In non-limiting examples of the present disclosure, systems, methods and devices for executing a computing skill are provided. A connection between first and second devices may be established. The devices may operate on different platforms. An indication to execute the skill may be received via a first application of the first device in relation to content. A determination may be made as to whether the second device has an application that can execute the skill. The determination may be made by querying an application manifest of the second device. If a determination is made that the skill can be executed by the second device, a selectable element to execute that skill by the second device may be surfaced. A selection may be made of the element, the digital content may be sent from the first device to the second device, and the skill may be executed by the second device.

20 Claims, 13 Drawing Sheets

(56) References Cited

U.S. PATENT DOCUMENTS

| | | |
|---|---|---|
| 2010/0273450 A1 | 10/2010 | Papineau et al. |
| 2013/0007484 A1 | 1/2013 | Gobriel et al. |
| 2014/0129859 A1 | 5/2014 | O'malley et al. |
| 2015/0256620 A1 | 9/2015 | Sugano |
| 2016/0232365 A1* | 8/2016 | Oh .......................... G06F 21/51 |
| 2016/0239547 A1* | 8/2016 | Lim ....................... G06Q 30/08 |
| 2016/0292404 A1* | 10/2016 | Tseng ...................... G06F 21/31 |
| 2017/0010790 A1* | 1/2017 | Glover ................ G06F 16/9537 |
| 2019/0140697 A1 | 5/2019 | Yang et al. |
| 2019/0191017 A1 | 6/2019 | Aggarwal et al. |
| 2019/0394147 A1* | 12/2019 | Rodriguez ............ H04L 51/046 |
| 2020/0081560 A1 | 3/2020 | Geller et al. |
| 2020/0103951 A1 | 4/2020 | Gossain |
| 2021/0050009 A1 | 2/2021 | Lo |
| 2022/0066405 A1 | 3/2022 | Harvey |
| 2022/0182937 A1 | 6/2022 | Guo |
| 2022/0357937 A1 | 11/2022 | Tav et al. |
| 2023/0305857 A1 | 9/2023 | Shah et al. |
| 2024/0241731 A1 | 7/2024 | Shah |

OTHER PUBLICATIONS

"Notice of Allowance Issued in U.S. Appl. No. 17/706,356", Mailed Date: Oct. 27, 2023, 9 Pages.
"International Search Report and Written Opinion Issued in PCT Application No. PCT/US23/010004", Mailed Date: Apr. 20, 2023, 10 Pages.
Non-Final Office Action mailed on Nov. 21, 2024 in U.S. Appl. No. 18/422,581, 19 pages.

* cited by examiner

CROSS-PLATFORM COMPUTING SKILL EXECUTION

CROSS REFERENCE TO RELATED APPLICATIONS

This application is a continuation of and claims the benefit of and priority under 35 U.S.C. § 120 to U.S. patent application Ser. No. 17/028,108, filed Sep. 22, 2020, entitled "CROSS-PLATFORM COMPUTING SKILL EXECUTION," which is incorporated herein by reference in its entirety for all purposes.

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for executing computing skills across computing platforms, devices, and operating system instances. In examples, a connection between a first computing device operating on a first platform and a second computing device operating on a second platform may be established. The connection may be established via a device mirroring application that is executed by the first and second computing devices.

An application manifest that has been at least partially copied from the second computing device may be maintained by the first computing device. The application manifest may comprise a first entry comprising an identity of a first computing skill that is executable, via invocation from a first application executed by the first computing device, by a second application executed by the second computing device. In some examples, the first computing skill may comprise a digital content sharing skill.

First content (e.g., an image, a video, a webpage) may be accessed by the first application executed by the first computing device. An indication to execute the first computing skill may be received in relation to the first content on the first computing device. For example, a share icon may be interacted with in relation to the first content and the first application. A selectable option to execute the first computing skill may be surfaced by the first computing device. In some examples, the selectable option may indicate that the first computing skill will be executed by the second computing device or an application executed by the second computing device.

Upon selection of the selectable option, the first content may be transferred from the first computing device to the second computing device. In some examples, the first content may be transformed from a first format to a second format that is readable and/or executable by the second computing device, an operating system of the second computing device, or the second application executed by the second computing device. The first computing skill may then be executed in associated with the first content by the second application executed by the second computing device.

BRIEF DESCRIPTION OF THE DRAWINGS

Non-limiting and non-exhaustive examples are described with reference to the following figures.

DETAILED DESCRIPTION

Figure 1:
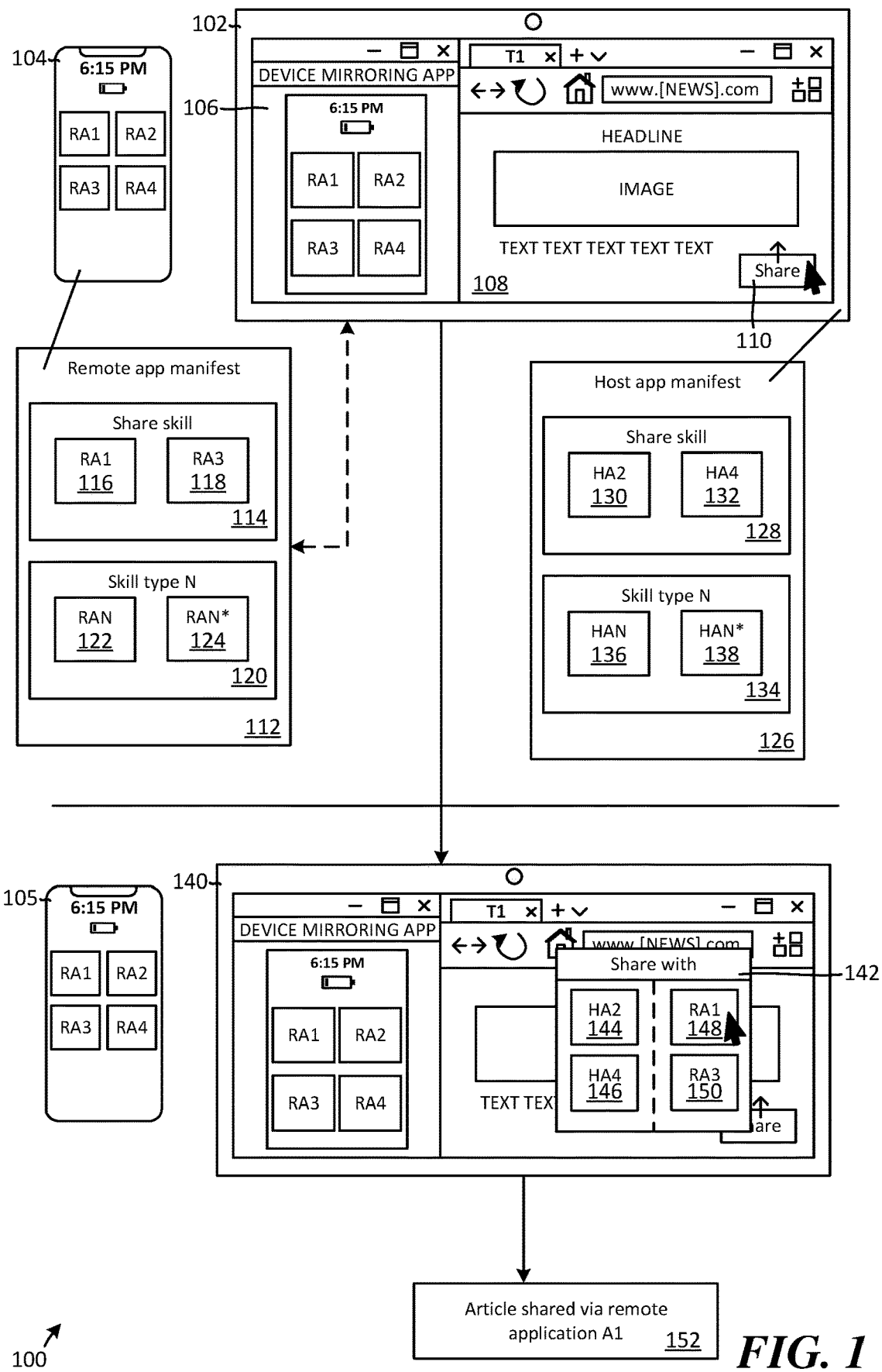
FIG. 1 is a schematic diagram illustrating an example computing environment for exposing and utilizing cross-platform operating system contracts.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with executing computing skills across platforms. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device.

According to examples, a first computing device operating on a first platform may connect with a second computing device operating on a second platform. Both computing devices may be executing a device mirroring application, and the connection may be established by the device mirroring application via Wi-Fi, Bluetooth, or local area network. Once connected, the first computing device may query or probe an application manifest of the second computing device to determine which applications the second computing device executes and what the computing skills are that are available to those applications. The second computing device may send a list of the applications and computing skills that it executes back to the first computing device, and the first computing device may save a copy of that application manifest to local memory or to a cloud location accessible by the first computing device.

A user may interact with a computing skill element (e.g., a share content element, a virtual keyboard element) in a first application executed by the first computing device. Upon receiving the interaction, the first computing device may analyze the application manifest that it copied (or partially copied) from the second computing device to determine whether the second computing device has any applications that can execute the computing skill. If a determination is made that the computing skill can be executed by an application of the second computing device, the first computing device may surface a selectable element for executing the computing skill in the first application. If the computing skill can also be executed by one or more applications of the first computing device, the first computing device may surface an identity of those local applications in addition to the identity of the application of the second computing device that can execute the computing skill.

If a selection is made of the selectable element corresponding to the application on the second computing device, the first computing device may send digital content accessed via the first application executed by the first computing device to the second computing device. In some examples, the digital content may be transformed to a normalized format that can be read and/or executed by the second computing device, the operating system of the second computing device, or the application that is going to execute the computing skill on the second computing device. Once the digital content is received, the application that executes the computing skill on the second computing device may execute the computing skill.

The systems, methods, and devices described herein provide technical advantages for interacting with applications and computing skills across platforms. Memory costs associated with storing multiple instances of applications (a same application on each device) are greatly reduced in that a user may access computing skills and applications on a second computing device from a first computing device. For example, rather than having to install multiple instances of a social media application or messaging application that is primarily used on a mobile computing device to accomplish sharing of content accessed on a desktop computing device, the current mechanisms allow the desktop device to share content to those applications on the mobile device via the exposure of operating system contracts, or application manifests.

Processing costs associated with sharing content accessed on a first device via a second device are also reduced via the mechanisms described herein. For example, while a user might be able to email themselves content accessed on a desktop device, access that email and content on a mobile computing device, and share the content from the email via one or more applications that are only installed on the mobile computing device, the number of processing steps needed to accomplish that sharing is reduced via the direct sharing mechanisms described herein. That is, the user need not save the content to the desktop device, perform the email steps, and/or resaving of the content to the mobile device prior to its sharing. Rather, examples described herein allow a first computing device to send content directly to a second computing device where a computing skill can be automatically performed by an application of the second computing device, eliminating extraneous processing and storage steps. Further, there are many applications that are only available on mobile devices, and therefore without the use of the mechanisms described herein, it would be impossible to interact with those applications from a desktop device.

FIG. 1 is a schematic diagram illustrating an example computing environment 100 for exposing and utilizing cross-platform operating system contracts. Computing environment 100 includes computing device 102, computing device 104, computing device 140, and computing device 105. Computing devices 102 and 140 are the same computing device, with computing device 140 displaying the result of operations executed in the upper portion of FIG. 1. Similarly, computing devices 104 and 105 are also the same device at different times. Computing environment 100 further includes remote application manifest 112, host application manifest 126, and operation execution element 152.

Computing device 102 and computing device 104 have established a connection (e.g., via Wi-Fi, via Bluetooth, via local area network) with one another. Computing device 102 and computing device 104 may each be executing a device mirroring application, which allows computing device 102 and computing device 104 to communicate with one another. In some examples, the device mirroring application may allow each connected device to expose application manifest data to one another, as well as to send and receive digital content between each other. In this example, the device mirroring application executed on computing device 102 also causes the surfacing of mirroring user interface 106, which mirrors the user interface of connected computing device 104 on the display of computing device 102.

Computing device 102 includes host application manifest 126. In this example, the designation "host" application manifest 126 describes computing device 102 as the host device that mirrors content from a remote device (e.g., remote computing device 104). Host application manifest 126 comprises the identities of computing skills that computing device 102 can execute and the identities of the applications on computing device 102 that execute those computing skills. Specifically, host application manifest 126 includes share skill 128, which is a computing skill that computing device 102 can execute on its own (e.g., without communicating with computing device 104), host application two 130, and host application four 132. Host application two 130 and host application four 132 are the applications of computing device 102 that can execute share skill 128.

Host application manifest 126 also includes computing skill type N 134, which is illustrative of one or more additional skills that computing device 102 can execute on its own, host application N 136, and host application N*138, which are the applications of computing device 102 that can execute computing skill type N 134.

Computing device 104 includes remote application manifest 112. The designation "remote" application manifest 112 describes computing device 104 as the remote device that is being mirrored by the host device (e.g., host computing device 102). Remote application manifest 112 comprises the identities of computing skills that computing device 104 can execute and the identities of the applications on computing device 104 that execute those computing skills. Specifically, remote application manifest 112 includes share skill 114, which is a skill that computing device 104 can execute on its own (e.g., without communicating with computing device 104), remote application one 116, and remote application three 118. Remote application one 116 and remote application three 118 are the applications of computing device 104 that can execute share skill 114.

Remote application manifest 112 also includes skill type N 120, which is illustrative of one or more additional skills that computing device 104 can execute on its own, remote application N 122, and remote application N*124, which are the applications of computing device 104 that can execute computing skill type N 120.

Share skill 128 may comprise a digital content sharing skill. For example, a user may interact with digital content (e.g., an image in a photos application, a video in a video application, an article on a news website open on a web browser application, a link from a web browser search on a web browser application), or a share user interface element associated with digital content, which may cause selectable options for sharing the digital content via one or more applications (e.g., host application two 130, host application four 132), such as text messaging applications, group messaging applications, social media applications, etc. However, users frequently have one set of applications with sharing capabilities installed on a first one of their devices and a second set of applications with sharing capabilities installed on a second one of their devices. Thus, users are typically not able to share digital content seamlessly from a first application executed on a first computing device via another application that is installed on a second device. The current disclosure provides mechanisms for this seamless integration and communication by exposing contracts (e.g., application manifests) amongst connected devices.

In this example, a user has navigated to a news website in a web browser application of computing device 102. Specifically, the web browser application is navigated to specific news article 108 on the news website. An interaction is received via share user interface element 110. That interaction may comprise a left click, a touch input, or a voice input, for example. Because computing device 102 and computing device 104 are connected (e.g., via the device mirroring application), those computing devices may share application manifests with one another and expose the applications and associated computing skills (including attributes, requirements, and limits associated with those skills) to one another. In some examples, each connected computing device may maintain a separate application manifest for each computing device that it has connected to via the device mirroring application.

When computing device 102 initially connects to computing device 104 via the device mirroring application, computing device 104 may expose remote application manifest 112 to computing device 102. Computing device 102 may probe remote application manifest 112 to determine the computing skills that are available on that device, as well as the applications that execute them. Computing device 102 may then generate a list (e.g., a separate application manifest) of the applications and associated computing skills that computing device 104 may execute, and save that list (e.g., to local storage on computing device 102, to a cloud storage account accessible by computing device 102). Computing device 102 may update the list (e.g., the separate application manifest) it has for computing device 104 upon the occurrence of one or more criteria. For example, computing device 102 may update the list each time the devices are connected, at periodic intervals, and/or at run time (e.g., each time computing device 102 requests execution of a computing skill by computing device 104). The updates may take the form of new computing skills that are available on computing device 104, new attributes or requirements (e.g., new image sharing size cap availabilities or requirements, new capability to share videos) associated with existing computing skills on computing device 104.

Similarly, when computing device 104 initially connects to computing device 102 via the device mirroring application, computing device 102 may expose host application manifest 126 to computing device 104. Computing device 104 may probe host application manifest 126 to determine the computing skills that are available on that device as well as the applications that execute them. Computing device 104 may then generate a list (e.g., a separate application manifest) of the applications and associated computing skills that computing device 102 may execute, and save that list (e.g., to local storage on computing device 104, to a cloud storage account accessible by computing device 104). Computing device 104 may update the list (e.g., the separate application manifest) it has for computing device 102 upon the occurrence of one or more criteria. For example, computing device 104 may update the list each time the devices are connected, at periodic intervals, and/or at run time (e.g., each time computing device 104 requests execution of a computing skill by computing device 102). The updates may take the form of new computing skills that are available on computing device 102, new attributes or requirements (e.g., new image sharing size capabilities or requirements, new capability to share videos) associated with existing computing skills on computing device 102.

As computing device 102 maintains a separate application manifest for computing device 104 (e.g., a copy or partial copy of remote application manifest 112), it may determine that computing device 104 is capable of sharing news article 108 from the web browser accessed on computing device 102 via remote application one 116 and remote application three 118. Similarly, because of its own application manifest (e.g., host application manifest 126), computing device 102 may determine that it can share news article 108 via either of host application two 130 or host application four 132. As such, when an interaction is received at share user interface element 110, share application user interface element 142 is caused to be surfaced on computing device 140.

Share application user interface element 142 includes icons for four different applications that are each selectable for executing a share computing skill and sharing news article 108. Specifically, share application user interface element 142 includes a first selectable icon 144 corresponding to host application two 144 executed by computing device 102, a second selectable icon 146 corresponding to host application four 132 executed by computing device 102, a third selectable icon 148 corresponding to remote application one 116 executed by computing device 104, and a fourth selectable icon 150 corresponding to remote application three 118 executed by computing device 104.

In this example, a selection is made of third selectable icon 148, corresponding to remote application one 116, which causes computing device 140 to transfer news article 108 (or a link to news article 108) to computing device 104. Remote application one 116 may then execute share skill 114 and share news article 108 (or a link thereto). In some examples, digital content transferred from one computing device to another for sharing or otherwise performing a computing skill on may be transformed from a first format that is readable and/or executable by the sending computing device, to a second normalized format that is readable and/or executable by the receiving computing device.

Figure 2:
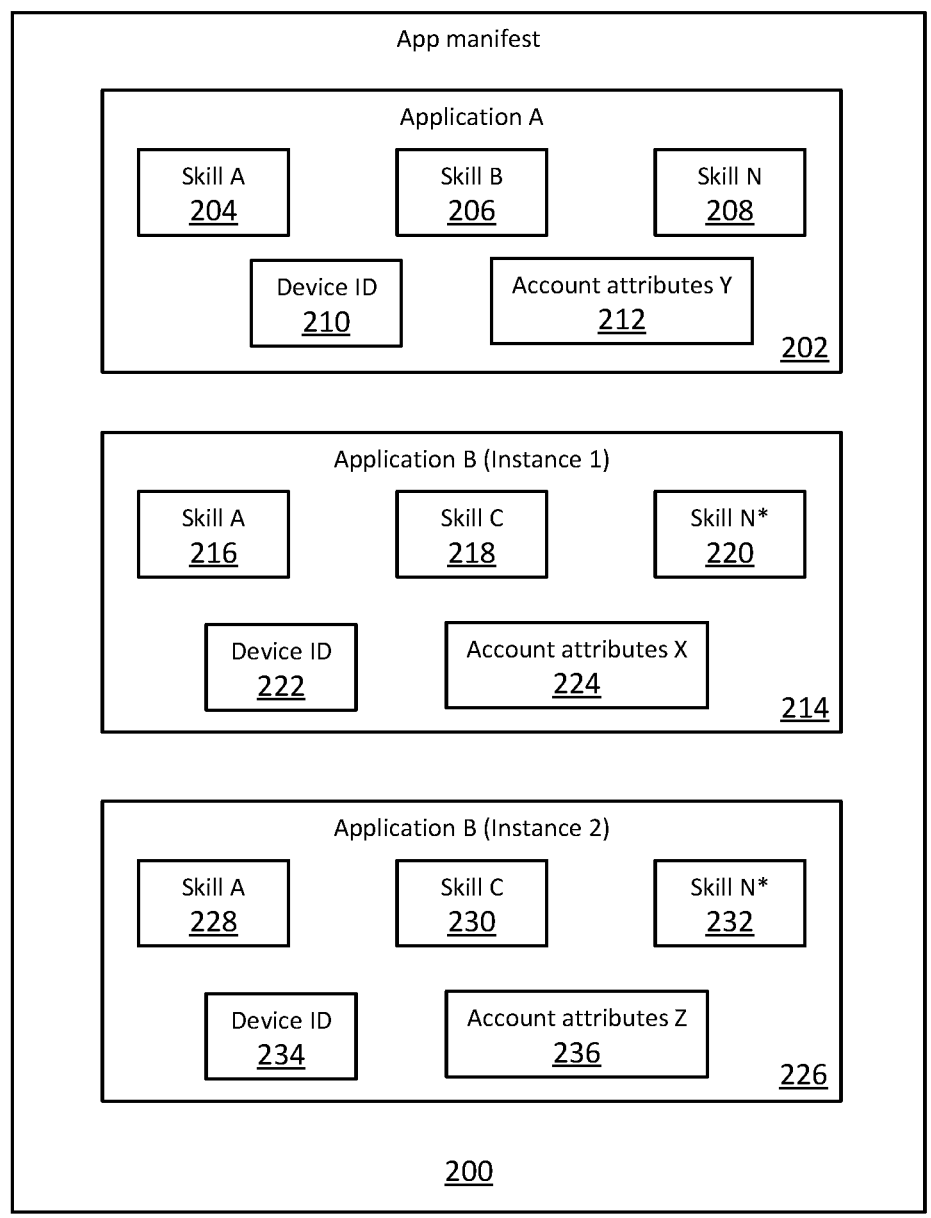
FIG. 2 is a simplified block diagram illustrating an exemplary application manifest.

FIG. 2 is a simplified block diagram illustrating an exemplary application manifest 200. Application manifest 200 may comprise an application manifest that a first computing device generates for a second computing device that the first computing device connects to (e.g., vi a device mirroring application). For example, application manifest 200 may comprise identities of applications and computing skills that are executable by a second computing device that is connected to a first computing device, and the first computing device may save application manifest 200 to its local memory. Application manifest 200 comprises the identity of application A 202, the identity of a first instance of application B 214, and an identity of a second instance of application B 226.

The identity of application A 202 is associated in application manifest 200 with a plurality of computing skills that are executable by application A 202. Those computing skills are skill A 204, skill B 206, and skill N 208. The identity of application A 202 is also associated in application manifest 200 with device ID 210 and account attributes Y 212. Device ID 210 may comprise identifying information (e.g., a character sequence, a barcode, etc.) of a computing device (e.g., the second computing device in this example) that executes application A 202. Account attributes Y 212 may comprise one or more attributes of a user account associated with one or both of a computing device that executes application A 202, or application A 202 itself. Thus, account attributes Y 212 may comprise an identity of a user or user account, sign-in credentials for a user account, application preferences of a user account, and/or application data for a user account, for example.

The first and second instances of application B may correspond to different types of accounts for application B. For example, the first instance of application B may correspond to a personal account type with first credentials and application data, and the second instance of application B may correspond to a work account type with second credentials and application data. In another example, the first instance of application B may correspond to a home account type with first application data or settings, and the second instance of application B may correspond to a traveling, exercising, or vacation account type with second application data or settings. In still another example, first instance of application B may correspond to a parent account type with first credentials and application data, and the second instance of application B may correspond to a kids account type with second credentials and application data.

The identity of the first instance of application B 214 is associated in application manifest 200 with a plurality of computing skills that are executable by the first instance of application B 214. Those computing skills are skill A 216, skill C 218, and skill N*220. The identity of the first instance of application B 214 is also associated in application manifest 200 with device ID 222 and account attributes X 224. Device ID 222 may comprise identifying information of a computing device that executes the first instance of application B 214. Account attributes X 224 may comprise one or more attributes of a user account associated with one or both of a computing device that executes the first instance of application B 214, or the first instance of application B 214 itself. Thus, account attributes X 224 may comprise an identity of a user or user account, sign-in credentials for a user account, application preferences of a user account, and/or application data for a user account, for example. As such, account attributes X 224 differ from account attributes Y 212 at least due to different application preferences and/or application data for the two different applications.

The identity of the second instance of application B 226 is associated in application manifest 200 with a plurality of computing skills that are executable by the second instance of application B 226. Those computing skills are skill A 228, skill C 230, and skill N*232. The identity of the second instance of application B 226 is also associated in application manifest 200 with device ID 234 and account attributes Z 236. Device ID 234 may comprise identifying information for a computing device that executes the second instance of application B 226. In this example, device ID 210, device ID 222, and device ID 234 may all be the same device ID. Account attributes Z 236 may comprise one or more attributes of a user account associated with one or more of a computing device that executes the second instance of application B 226, or the second instance of application B 226 itself. Thus, account attributes Z 236 may comprise an identity of a user or user account, sign-in credentials for a user account, application preferences of a user account, and/or application data for a user account, for example. As such, account attributes Z 236 differ from account attributes X 224 at least due to different application data for the two different instances of the same application.

Figure 3:
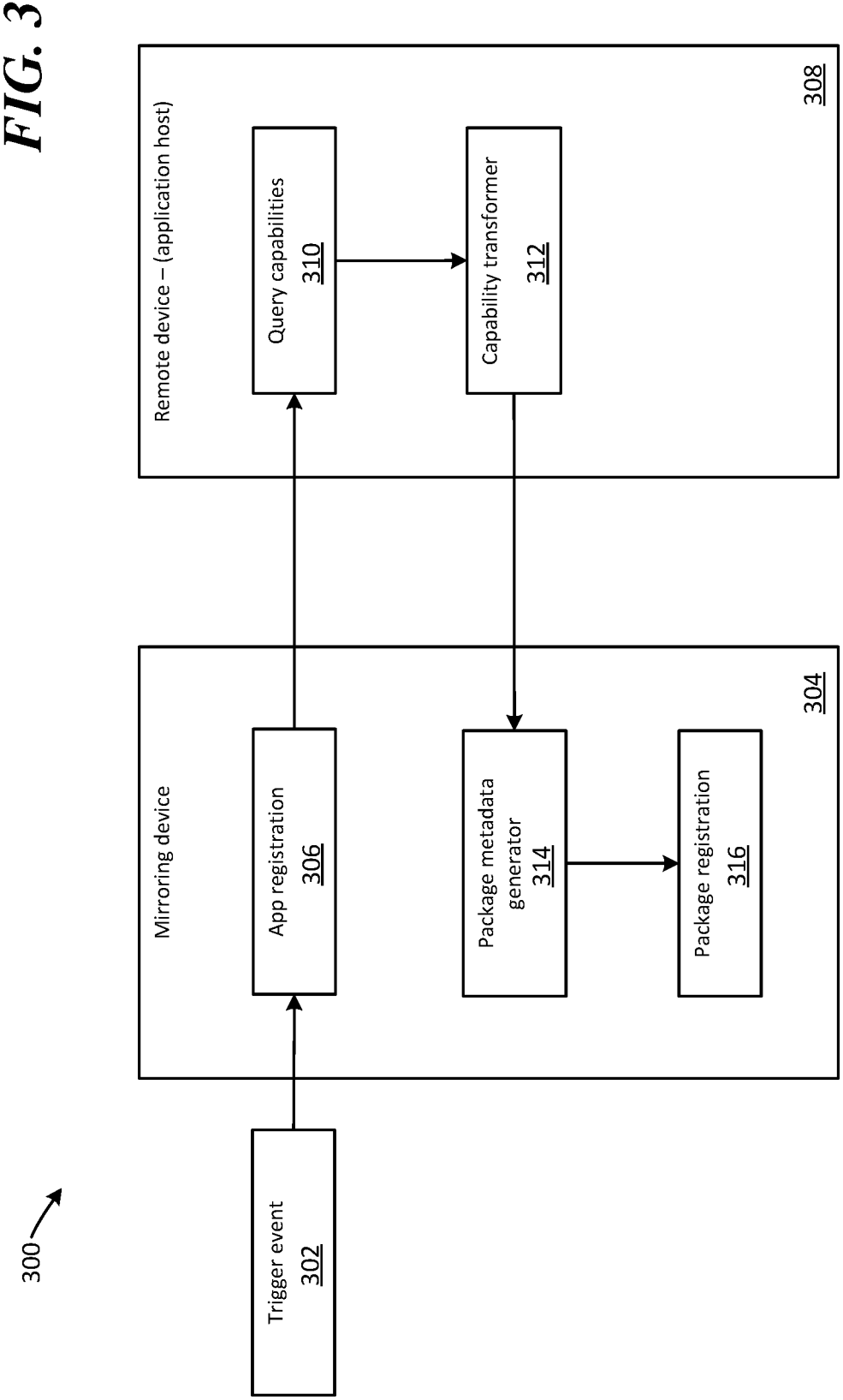
FIG. 3 is a simplified block diagram of a computing environment illustrating the registration of computing skills of a second computing device to an application manifest of a connected first computing device.

FIG. 3 is a simplified block diagram of a computing environment 300 illustrating the registration of computing skills of a first computing device 304 to an application manifest of a connected second computing device 308. Computing environment 300 includes trigger event 302, first computing device 304, and second computing device 308. First computing device 304 operates on a first platform and second computing device 308 operates on a second platform. In this example, first computing device 304 is designated as "mirroring device" because in some examples it may include a device mirroring window that mirrors the user interface of second computing device 308. Additionally, in this example, second computing device 308 is designated as "remote device—(application host)" because it is the remote device that may be mirrored on first computing device 304 and it hosts (e.g., has installed on it) the applications that first computing device 304 may request remote execution of.

Trigger event 302 is illustrative of one or more events that may cause first computing device 304 to register or update an application manifest for second computing device 308. Specifically, trigger event 302 may comprise an install event, a timeout, a periodic interval occurring, or a device boot, for example. Thus, when trigger event 302 occurs, computing device 304 probes (as illustrated by application registration element 306) second computing device 308 (as illustrated by query capabilities element 310) to determine what applications and associated computing skills are available on second computing device 308.

Capability transformer 312 may take generic descriptions of the applications and computing skills that are available on second computing device 308 and transform and/or normalize those descriptions into a form that is readable and/or executable by computing device 304. For example, if there are two different instances of an application executed by second computing device 308, capability transformer 312 may augment that data with the different user credentials and/or account data for each application instance.

Package metadata generator 314 receives the data from capability transformer 312 and converts it into a format that the native operating system of first computing device 304 can read and understand. Package metadata generator then sends the converted data to package registration element 316 which illustrates the registration of the application and computing skill data with the application manifest for second computing device 308 on first computing device 304.

Figure 4:
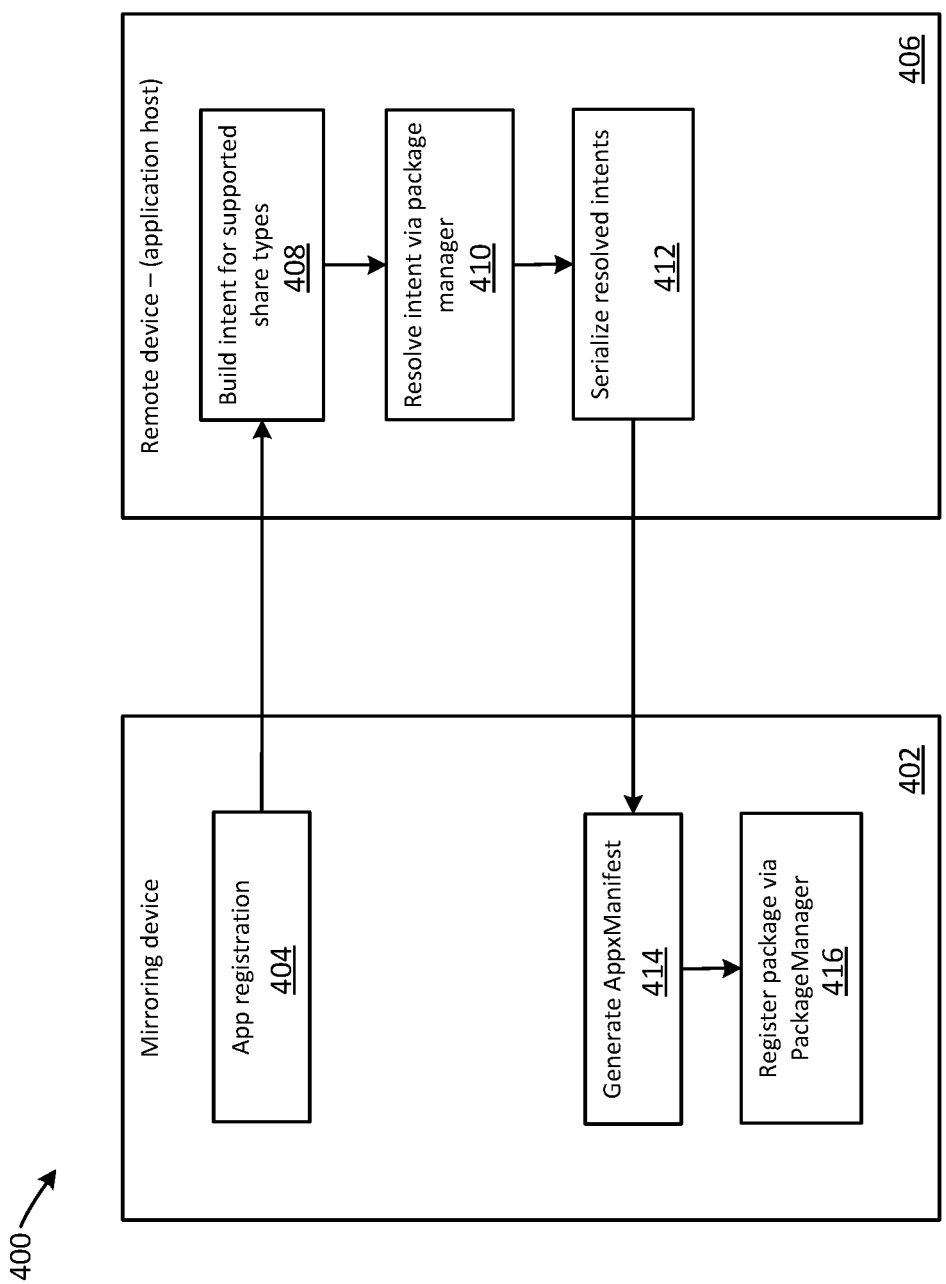
FIG. 4 is a simplified block diagram of a computing environment illustrating the registration of a sharing skill of a second computing device to an application manifest of a connected first computing device.

FIG. 4 is a simplified block diagram of a computing environment 400 illustrating the registration of a sharing skill of a second computing device 406 to an application manifest of a connected first computing device 402. Computing environment 400 includes first computing device 402 and second computing device 406. First computing device 402 operates on a first platform and second computing device 406 operates on a second platform. In this example, first computing device 402 is designated as "mirroring device" because in some examples it may include a device mirroring window that mirrors the user interface of second computing device 406. Additionally, in this example, second computing device 406 is designated as "remote device—(application host)" because it is the remote device that may be mirrored on first computing device 402 and it hosts (e.g., has installed on it) the applications that first computing device 402 may require remote execution of.

In this example, a triggering event (not shown) causes first computing device 402 to query second computing device 406 to determine whether one or more applications of second computing device 406 have new sharing skills available or if existing sharing skills need to be updated. The query is illustrated as originating at application registration element 404. The query is received by second computing device 406, as illustrated by build intent for supported share types element 408. That is, second computing device 406 builds intents for different computing skill types that it will make available for execution via first computing device 402. In this example, second computing device 406 builds an intent for a sharing computing skill type.

Resolve intent via package manager element 410 is illustrative of one or more operations that may be taken by second computing device 406 to query its applications and determine whether it can share one or more types of digital content, and if so, which types. Thus, the package manager illustrated by resolve intent via package manager element 410 may query, or probe, one or more of its hosted applications and determine whether they are capable of performing sharing actions on images, videos, audio, and/or hyperlinks, for example. The package manager may also determine what the requirements or attributes of those digital media types are that can be shared by the applications.

Serialize resolved intents element 412 is illustrative of one or more operations that second computing device 406 may execute on the data describing the applications and types of sharing actions determined from the package manager to transform that data into a normalized format that can be sent, received, and read by first computing device 402.

Generate appendix manifest element 414 is illustrative of one or more operations that first computing device 402 may execute on the data it receives from second computing device 406 to package that data into a formatted document. That formatted document may then be registered as part of the application manifest for second computing device 406 on first computing device 402, as illustrated by register package via package manager element 416.

Figure 5:
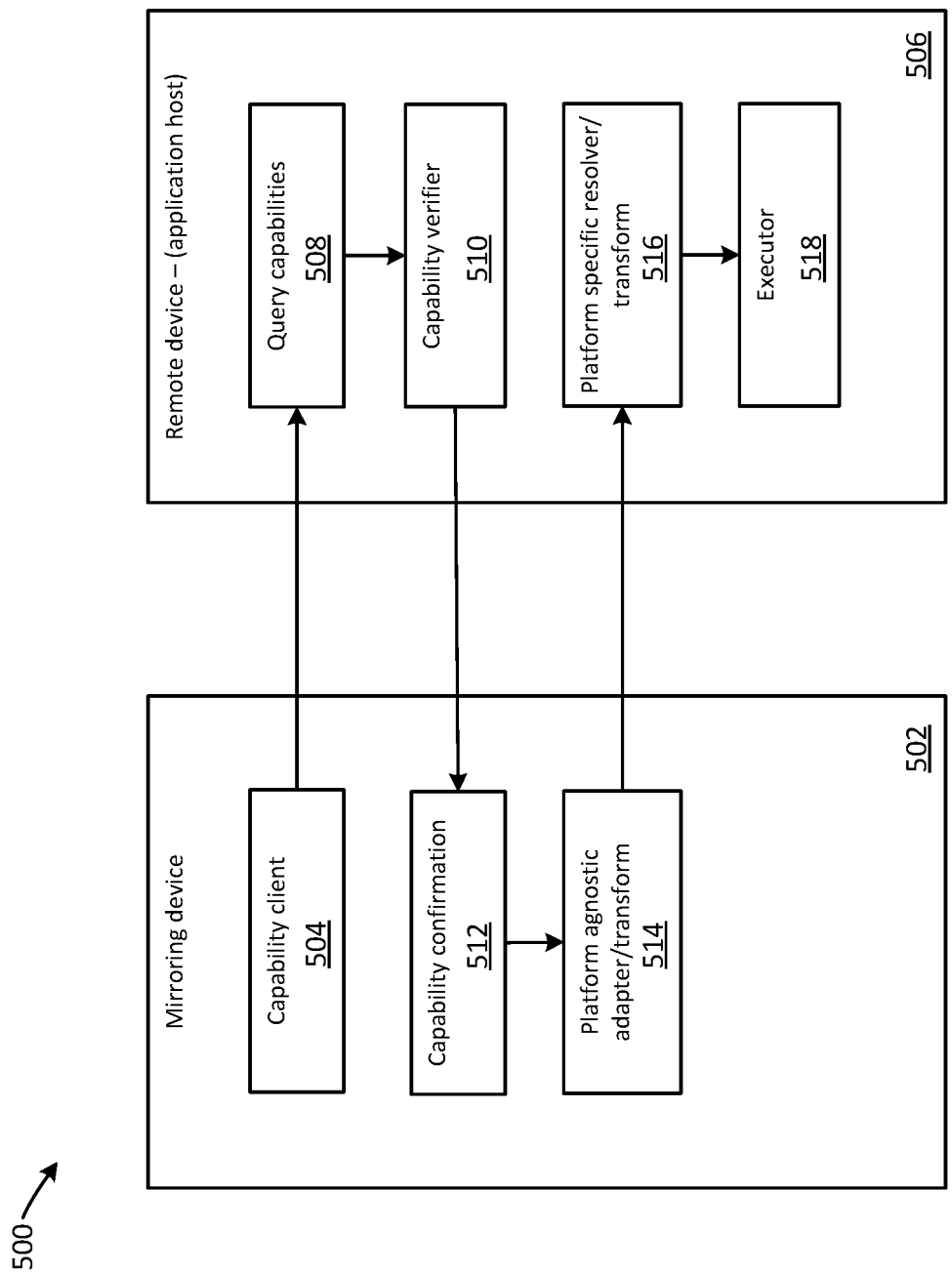
FIG. 5 is a simplified block diagram of a computing environment illustrating the invocation of a computing skill from a first computing device and execution of that skill by a connected second computing device.

FIG. 5 is a simplified block diagram of a computing environment 500 illustrating the invocation of a computing skill from a first computing device 502 and execution of that skill by a connected second computing device 506. Computing environment 500 includes first computing device 502 and second computing device 506. First computing device 502 operates on a first platform and second computing device 506 operates on a second platform. In this example, first computing device 502 is designated as "mirroring device" because in some examples it may include a device mirroring window that mirrors the user interface of second computing device 506. Additionally, in this example, second computing device 506 is designated as "remote device—(application host)" because it is the remote device that may be mirrored on first computing device 502 and it hosts (e.g., has installed on it) the applications that first computing device 502 may require remote execution of.

In this example, first computing device 502 has received an indication to cause a computing skill to be executed by second computing device 506. The indication may be received from a first application executed on computing device 502 and the indication may include an identity of a second application on second computing device 506 that is to execute the computing skill. Prior to execution of the computing skill, first computing device 502 verifies that the information in the application manifest it maintains for second computing device 506 and the computing skill that is to be executed is up to date.

Capability client 504 of first computing device 502 sends a query to second computing device 506, as illustrated by query capabilities element 508. Query capabilities element 508 is illustrative of one or more operations second computing device 506 may take to determine which application and computing skill is being requested by capability client 504. Capability verifier element 510 is illustrative of one or more operations that second computing device 506 may take once the application and computing skill is identified to send that information back to first computing device 502.

Capability confirmation element 512 is illustrative of one or more operations that first computing device 502 may take to determine whether the information related to the requested application and computing skill match the corresponding information from the application manifest that first computing device 502 maintains for second computing device 506. If the information matches, no changes to the application manifest are necessary. If the information does not match (e.g., there have been modifications, deletions, or additions to the application that affect the requested computing skill), first computing device 502 may update the application manifest for that particular application and skill.

Platform agnostic adapter/transform element 514 is illustrative of one or more operations that first computing device 502 may take to transform digital content related to the computing skill that is to be executed to a format that is readable and executable by second computing device 506. For example, a webpage that is to be shared via a sharing skill may be transformed into a link, or one or more images from the webpage may be downsized to meet sharing requirements of the application that is going to execute the sharing skill on second computing device 506. Alternatively, second computing device 506 may transform the data into a format that it can read and execute, as illustrated by platform specific resolver/transform 516.

Finally, executor element 518 illustrates that second computing device executes the computing skill on the transformed data.

Figure 6:
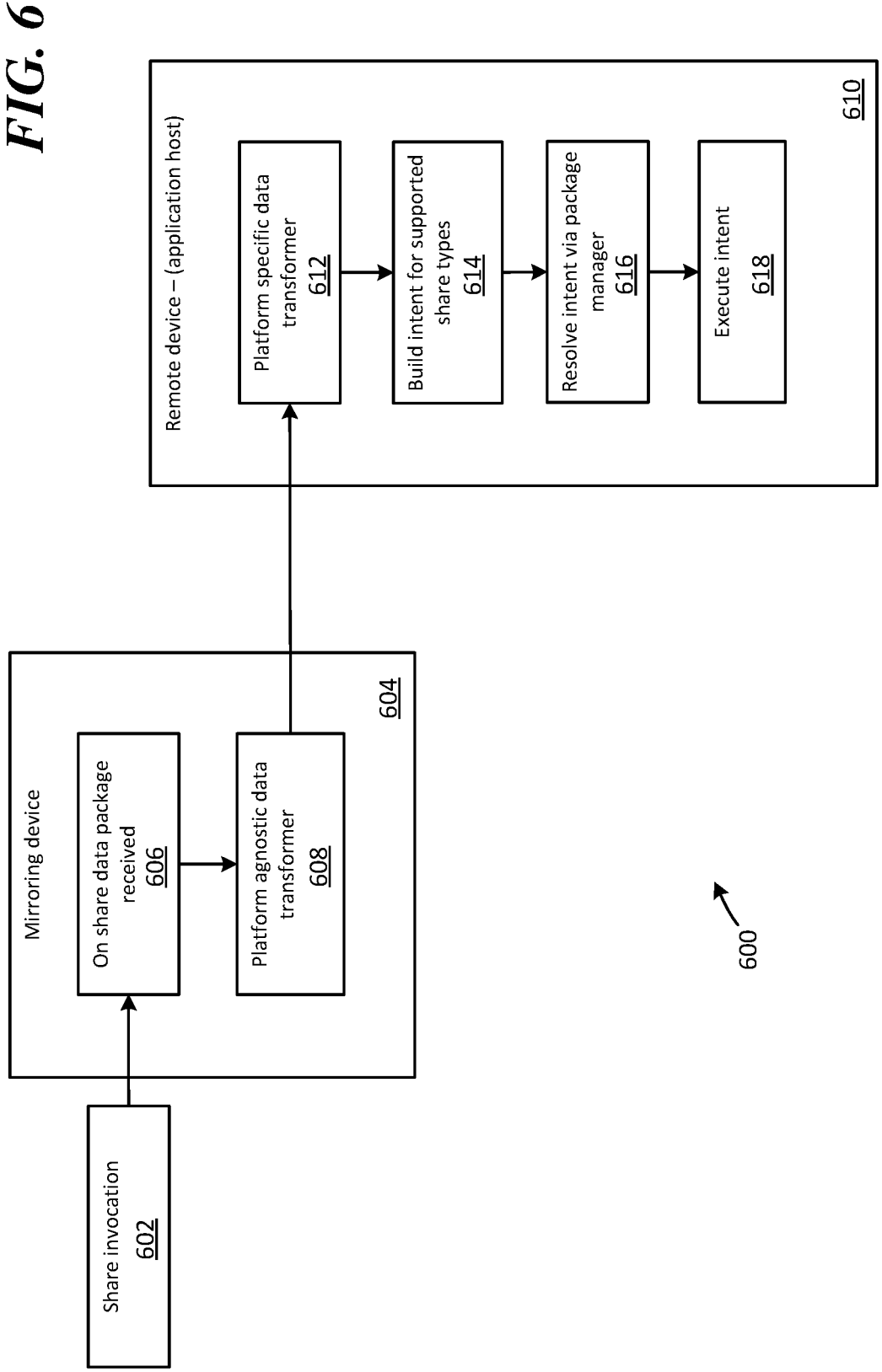
FIG. 6 is a simplified block diagram of a computing environment illustrating the invocation of a sharing skill from a first computing device and execution of that skill by a connected second computing device.

FIG. 6 is a simplified block diagram of a computing environment 600 illustrating the invocation of a sharing skill from a first computing device 604 and execution of that skill by a connected second device 610. Computing environment 600 includes first computing device 604 and second computing device 610. First computing device 604 operates on a first platform and second computing device 610 operates on a second platform. In this example, first computing device 604 is designated as "mirroring device" because in some examples it may include a device mirroring window that mirrors the user interface of second computing device 610. Additionally, in this example, second computing device 610 is designated as "remote device—(application host)" because it is the remote device that may be mirrored on first computing device 604 and it hosts (e.g., has installed on it) the applications that first computing device 604 may require remote execution of.

First computing device 604 receives an indication to cause a sharing skill to be executed by second computing device 610. The indication is illustrated by share invocation element 602. As an example, first computing device 604 may receive an interaction with a "share" user interface element in relation to digital content (e.g., an image, a video, an article, a post) in an application executed by first computing device 604.

First computing device 604 identifies the digital content that is to be shared (e.g., the image, the video, the article, the post), as illustrated by on share data package received element 606. First computing device 604 may then transform that data into a normalized format, as illustrated by platform agnostic data transformer 608. Second computing device 610 then takes the normalized data, as illustrated by platform specific data transformer 612, and transforms it into a format that is readable and executable by the operating system of second computing device 610.

Second computing device 610 may then probe the application manifest for the share skill type that is requested to ensure that the application can still execute that skill on the transformed data, as illustrated by build intent for supported share types 614. Once it is confirmed that the content can be shared via the application and sharing skill, computing device 610 requests execution of the sharing skill on the transformed content, as illustrated by resolve intent via package manager element 616, and the sharing skill is executed by second computing device 610 as illustrated by execute intent element 618.

Figure 7:
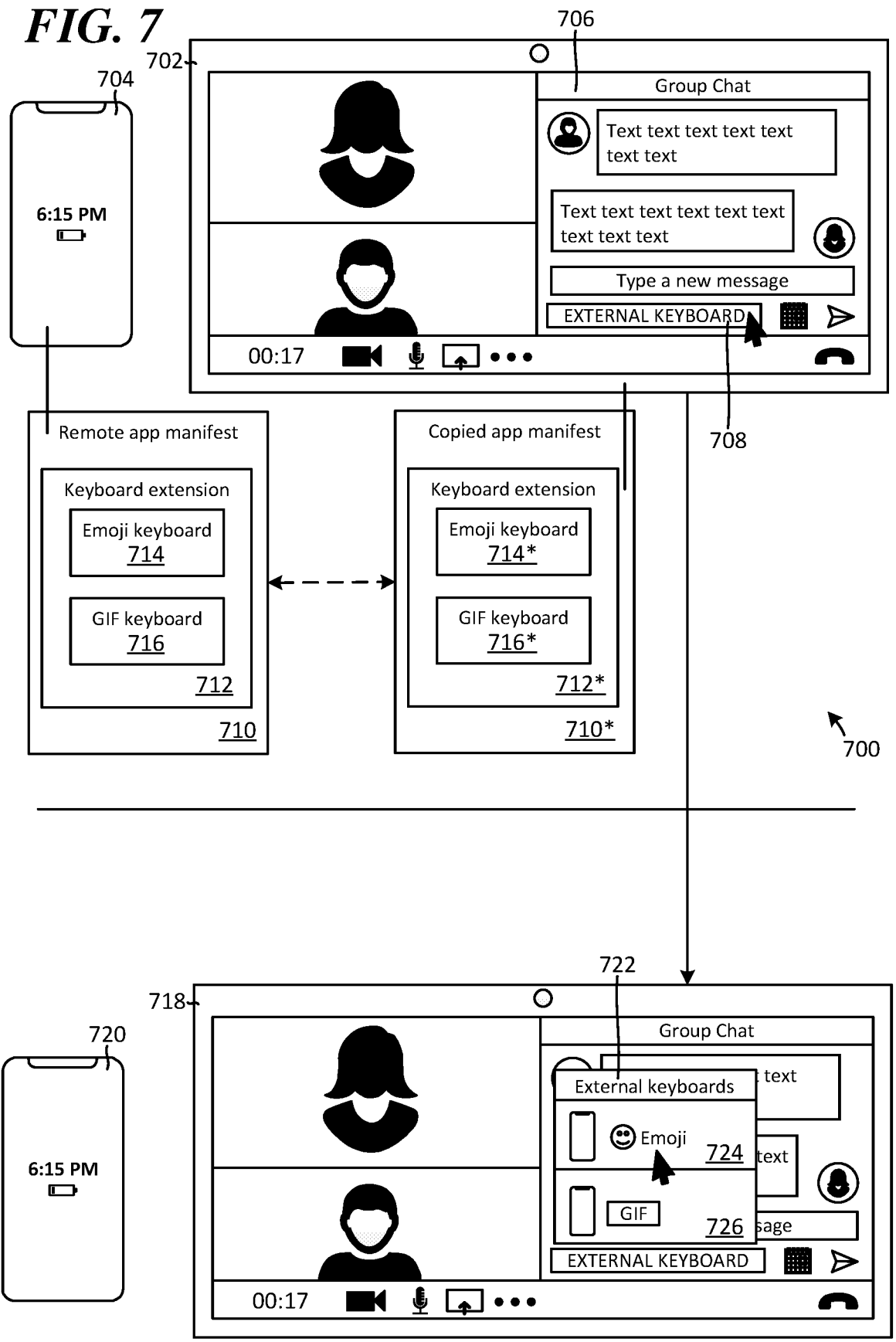
FIG. 7 is a schematic diagram illustrating an example distributed computing environment for invoking a virtual keyboard skill on a first computing device and executing that keyboard skill by a second connected computing device.

FIG. 7 is a schematic diagram illustrating an example distributed computing environment 700 for invoking a virtual keyboard skill on a first computing device 702/718 and executing that keyboard skill by a second connected computing device 704/720. Computing environment 700 includes first computing device 702 and 718, which are the same computing device. Computing environment 700 also includes second computing device 704 and 720, which are the same computing device.

First computing device 702 is currently executing and displaying a group communication application, with a live video meeting being displayed on the left side of the display, and a live group chat 706 being displayed on the right side of the display. First computing device 702 and second computing device 704 are connected (e.g., via Wi-Fi, via Bluetooth, via local area network) with one another. Computing device 702 and computing device 704 may each be executing a device mirroring application, although a mirroring window need not necessarily be displayed on either device.

Second computing device 704 includes remote application manifest 710, which for ease of illustration only includes the identity of one extension that is relevant to FIG. 7 and its associated relevant computing skills. As illustrated in FIG. 7, an application manifest may include not only applications and associated computing skills that are accessible by connected computing devices, but also extensions that are accessible by connected computing device. In this example, remote application manifest 710 includes the identity of keyboard extension 712, which is installed and executed by second computing device 704. Application manifest 710 also includes emoji keyboard skill 714 and GIF keyboard skill 716, which are both computing skills that are executable by keyboard extension 712. For example, emoji keyboard skill 714 may include a plurality of emoji characters that may be inserted in messaging applications via a keyboard tool, and GIF keyboard skill 716 may include a plurality of GIFs that may be inserted in messaging applications via a keyboard tool.

First computing device 702 has generated a copy of relevant information from remote application manifest 710. Specifically, first computing device 702 has generated copied application manifest 710\*, which includes keyboard extension 712\*, emoji keyboard 714\*, and GIF keyboard 716\*. Thus, first computing device 702 has a list of computing skills that second computing device 704 can execute, as well as a list of the corresponding applications and/or extensions that execute those computing skills.

In this example, an interaction is received in relation to external keyboard element 708 in live group chat 706. Although external keyboard element 708 includes the text "external keyboard", it should be understood that external keyboard element 708 may simply be a keyboard element and need not necessarily indicate that its selection relates to keyboards that are not directly available on computing device 702. The selection of external keyboard element 708 may cause the device mirroring application to verify that the information in copied application manifest 710\* is still up to date. That is, the device mirroring application on computing device 702 may query computing device 704 and remote application manifest 710 to determine if the applications, extensions, and/or computing skills and their properties/attributes still match copied application manifest 710\*. If they do not match, they may be updated in copied application manifest 710\*. If they do match, run-time flow of the process may continue.

Upon determining that copied application manifest 710\* is up to date, external keyboards window 722 may be caused to be surfaced on first computing device 718, which includes emoji selection element 724 and GIF selection element 726. In this example, a selection is made of emoji selection element 724. Second computing device 720 may send the emoji keyboard to first computing device 718, and the emojis of that keyboard may be utilized in live group chat 706. In some examples, when the emoji keyboard is sent from second computing device 720 to first computing device 718, the keyboard may be transformed into a normalized format that is readable by the operating system executed by first computing device 718. First computing device 718 may then transform the normalized format to a format that is readable and executable by the group communication application.

Figure 8A:
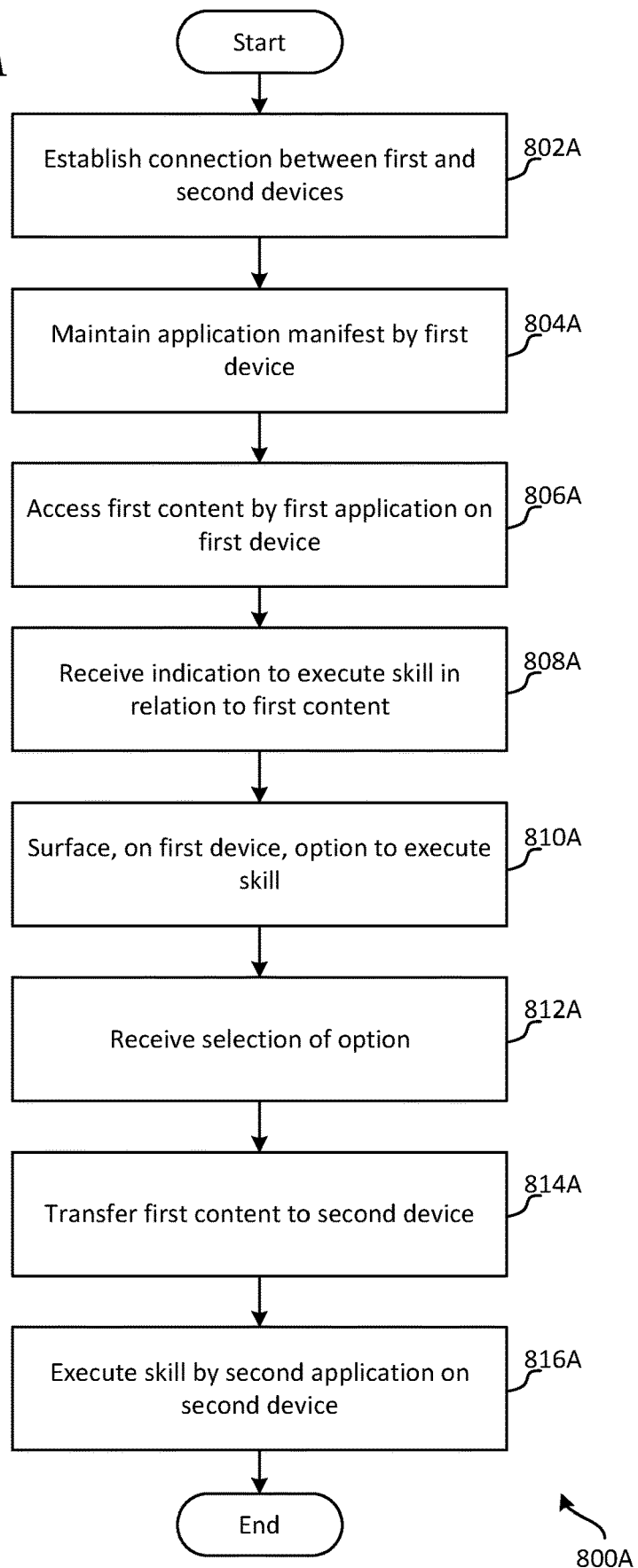
FIG. 8A is an exemplary method for invoking a computing skill on a first computing device and executing that skill on a second computing device.

FIG. 8A is an exemplary method 800A for invoking a computing skill on a first computing device and executing that skill on a second computing device. The method 800A begins at a start operation and flow moves to operation 802A.

At operation 802A a connection between a first computing device operating on a first platform and a second computing device operating on a second platform is established. The connection may comprise a Wi-Fi connection, a Bluetooth connection, or a local area network connection, for example. In some examples, both of the computing devices may be executing a device mirroring application and the connection may be established by the device mirroring application.

From operation 802A flow continues to operation 804A where an application manifest is maintained by the first computing device. The application manifest may comprise a first entry comprising an identity of a first computing skill that is executable, via invocation from a first application executed by the first computing device, by a second application executed by the second computing device. The application manifest may have been generated by the device mirroring application of the first computing device probing or querying an application manifest of the second computing device to determine computing skills that are executable by the second computing device and the properties, specifications, requirements, and/or attributes associated with those computing skills. In examples, the first computing skill may comprise a content sharing skill (e.g., share content via social media application, share content via messaging application).

From operation 804A flow continues to operation 806A where first content is accessed by the first application executed by the first computing device. The first content may comprise one or more images, one or more videos, one or more audio files, and/or one or more webpages or links to webpages.

From operation 806A flow continues to operation 808A where an indication to execute the first computing skill is received in relation to the first content on the first computing device. The indication may comprise interaction with a user interface element included in the first application. In other examples, the indication may comprise a verbal command to the first computing device and/or the first application.

From operation 808A flow continues to operation 810A where a selectable option to execute the first computing skill is caused to be surfaced by the first computing device. The selectable option may comprise an identity of one or more applications that can execute the first computing skill. In some examples, the selectable option may be surfaced with an indication that the second computing device will be executing the skill upon selection.

From operation 810A flow continues to operation 812A where a selection of the selectable option is received. The selection may comprise a mouse click, a touch input, and/or a voice input.

From operation 812A flow continues to operation 814A where the first content is transferred from the first computing device to the second computing device. In some examples, the first content may be transformed into a normalized format that is readable and/or executable by the operating system of the second computing device and/or the second application.

From operation 814A flow continues to operation 816A where the first computing skill is caused to be executed in association with the first content by the second application executed by the second computing device.

From operation 816A flow moves to an end operation and the method 800A ends.

Figure 8B:
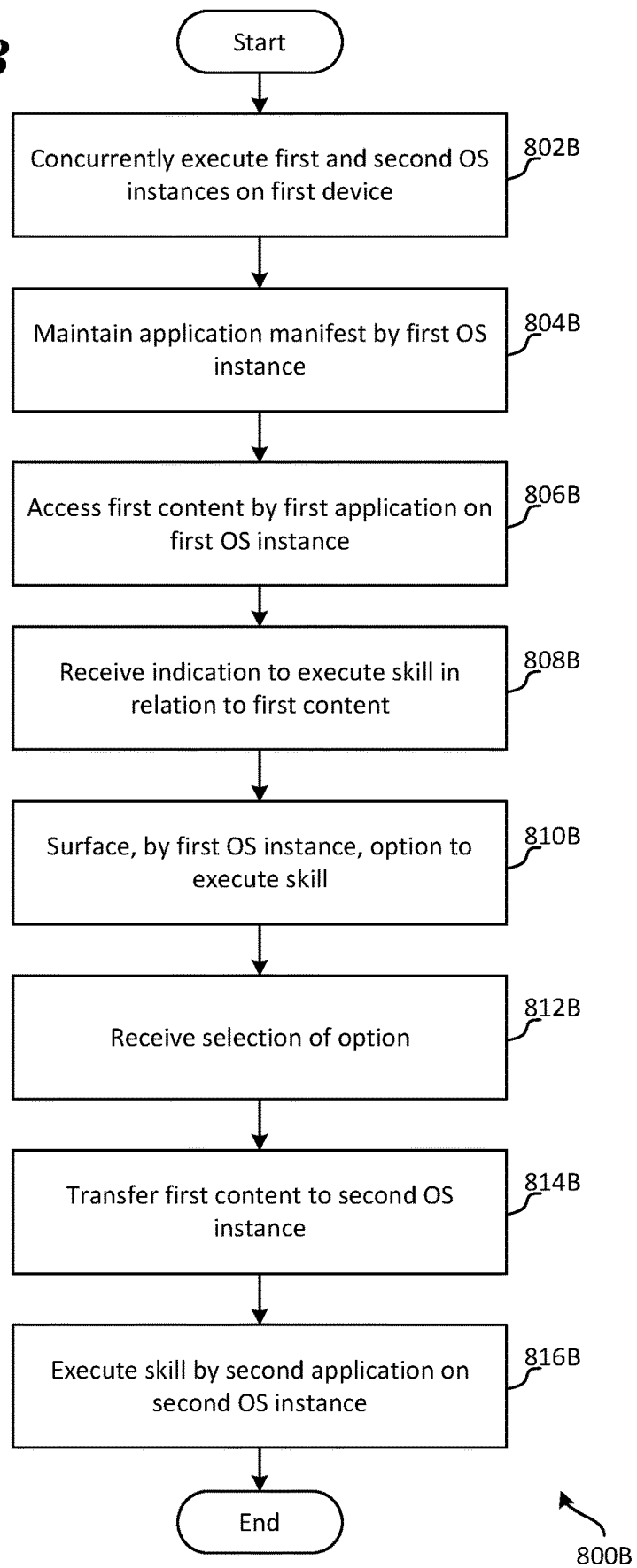
FIG. 8B is an exemplary method for invoking a computing skill on a first operating system instance of a first computing device and executing that skill by a second operating system instance of the first computing device.

FIG. 8B is an exemplary method 800B for invoking a computing skill on a first operating system instance of a first computing device and executing that skill by a second operating system instance of the first computing device. The method 800B begins at a start operation and flow moves to operation 802B.

At operation 802B a first operating system instance and a second operating system instance are concurrently executed by a first computing device. In some examples, the first operating system instance may comprise a different operating system than the first operating system instance. In other examples, the first operating system instance may comprise a work instance of a first operating system and the second operating system instance may comprise a home or personal instance of the first operating system. In some examples, the first operating system instance may execute a first plurality of applications, and the second operating system instance may execute a second plurality of applications that are at least partially different than the first plurality of applications.

From operation 802B flow continues to operation 804B where an application manifest is maintained by the first operating system instance. The application manifest may comprise a first entry comprising an identity of a first computing skill that is executable, via invocation from a first application executed by the first operating system instance, by a second application executed by the second operating system instance. Information from the application manifest may have been copied or sent from an application manifest of the second operating system instance to the first operating system instance.

From operation 804B flow continues to operation 806B where first content is accessed by the first application executed by the first operating system instance. The first content may comprise one or more images, one or more videos, one or more audio files, and/or one or more webpages or links to webpages.

From operation 806B flow continues to operation 808B where an indication to execute the first computing skill is received in relation to the first content on the first operating system instance. The indication may comprise interaction with a user interface element included in the first application. In other examples, the indication may comprise a verbal command to the first operating system instance and/or the first application.

From operation 808B flow continues to operation 810B where a selectable option to execute the first computing skill is caused to be surfaced by the first operating system instance. The selectable option may comprise an identity of one or more applications that can execute the first computing skill. In some examples, the selectable option may be surfaced with an indication that the second operating system instance will be executing the skill upon selection.

From operation 810B flow continues to operation 812B where a selection of the selectable option is received. The selection may comprise a mouse click, a touch input, and/or a voice input.

From operation 812B flow continues to operation 814B where the first content is transferred from the first operating system instance to the second operating system instance. In some examples, the first content may be transformed into a normalized format that is readable and/or executable by the second operating system instance and/or the second application.

From operation 814B flow continues to operation 816B where the first computing skill is caused to be executed in association with the first content by the second application executed by the second operating system instance.

From operation 816B flow moves to an end operation and the method 800B ends.

Figure 9:
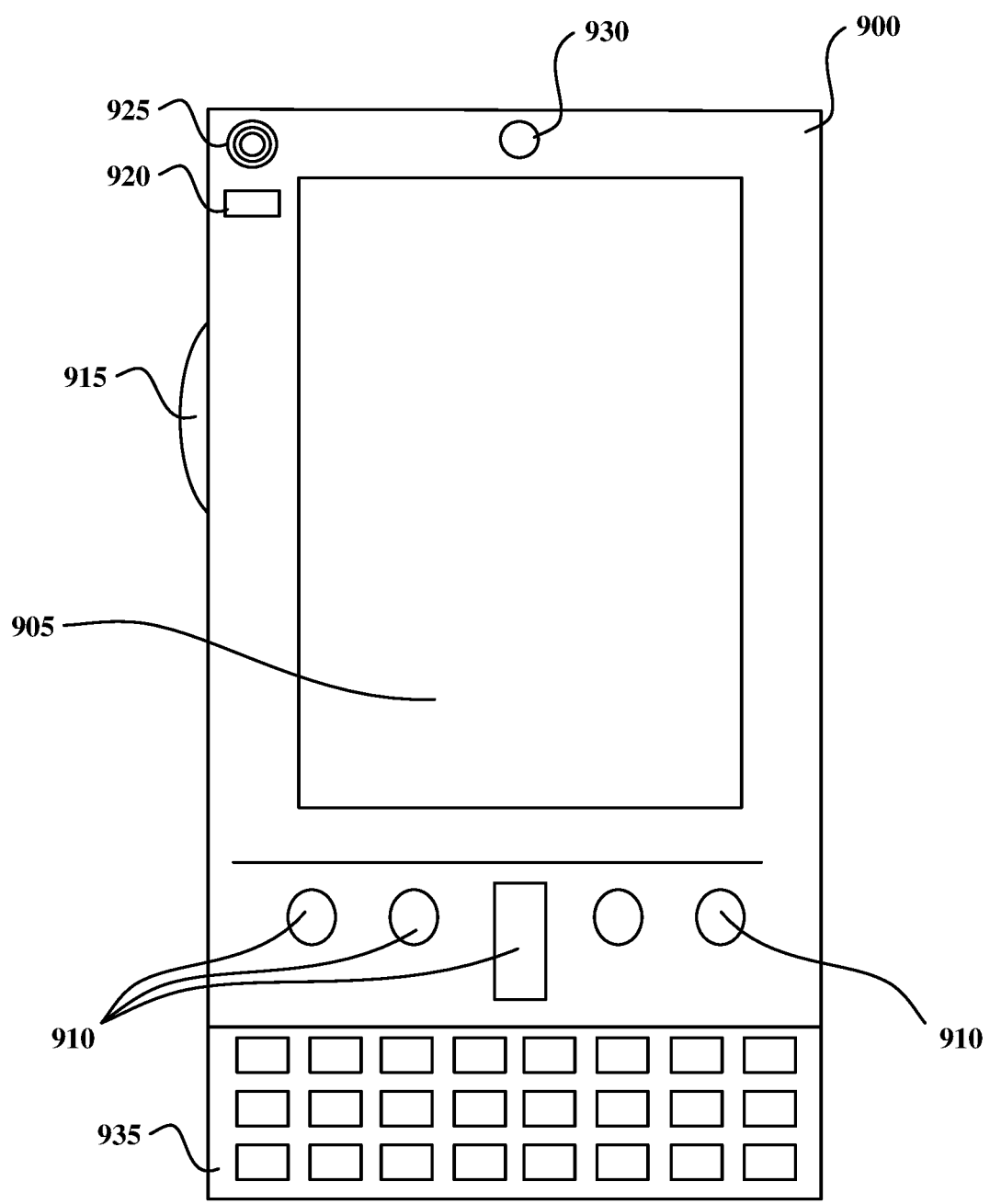
FIGS. 9 and 10 are simplified diagrams of a mobile computing device with which aspects of the disclosure may be practiced.
Figure 10:
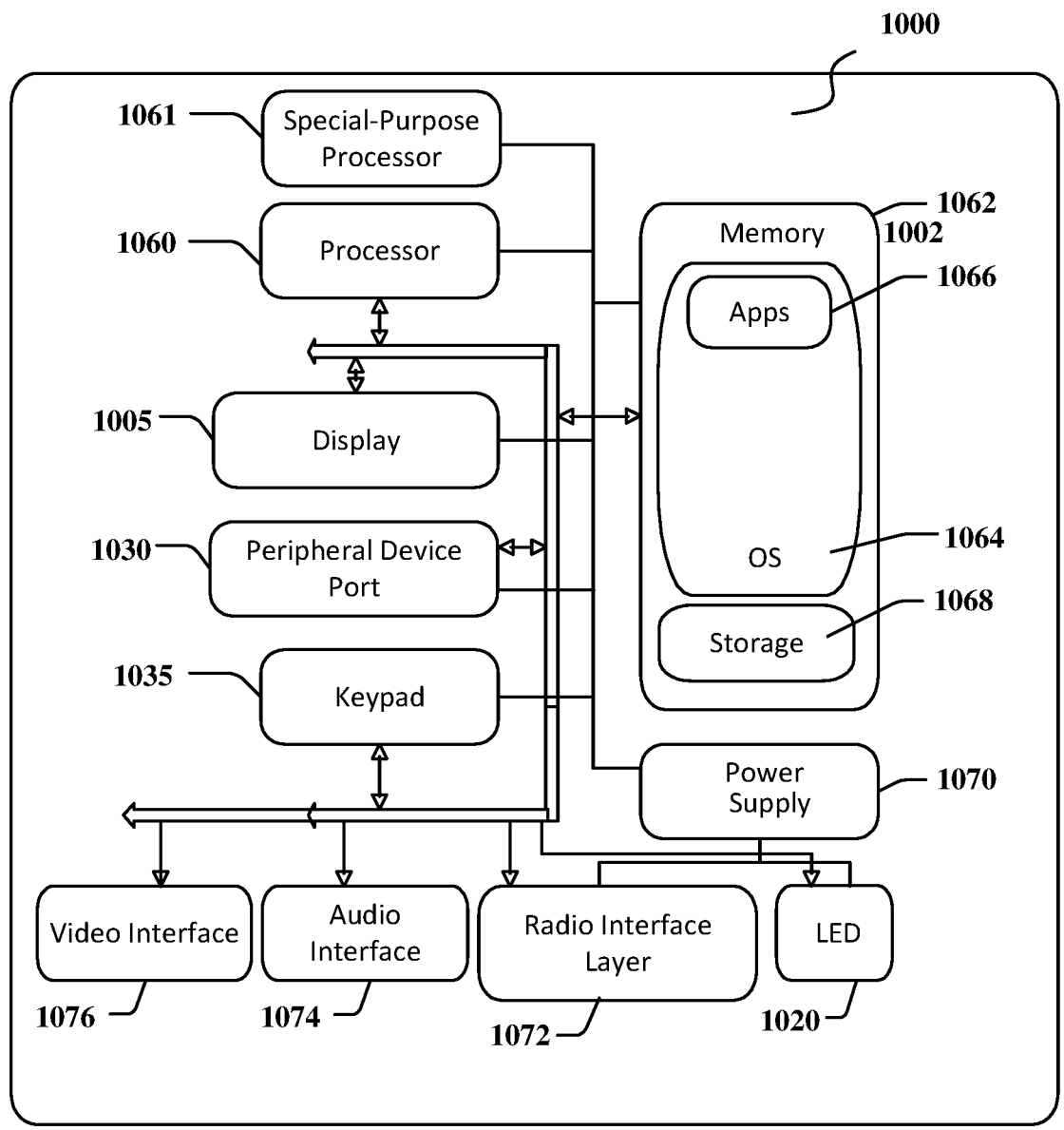

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a focus state notification platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
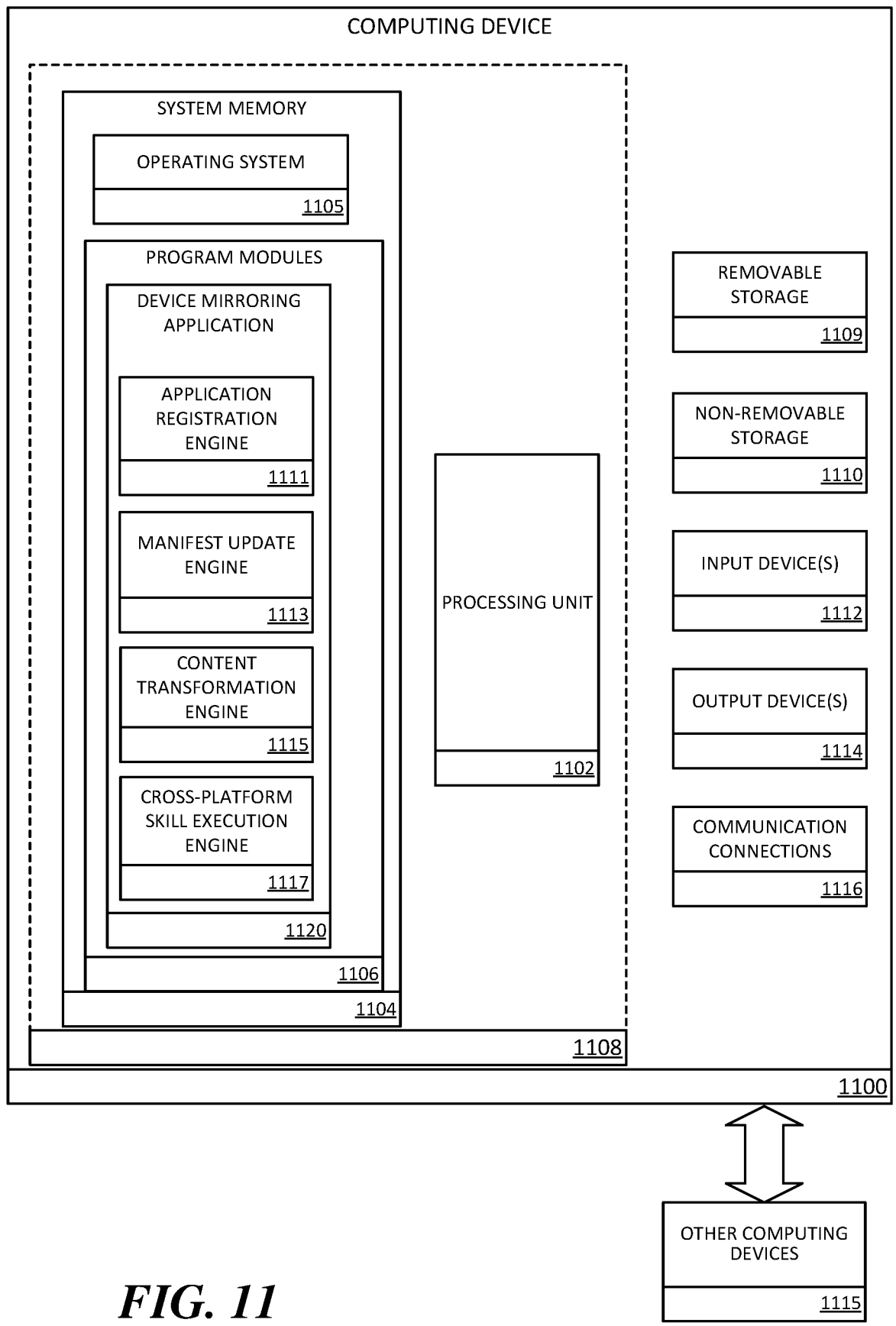
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for performing operations associated with a device mirroring application. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more application programs. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., device mirroring application 1120) may perform processes including, but not limited to, the aspects, as described herein. According to examples, application registration engine 1111 may perform one or more operations associated with identifying, from a first computing device, one or more applications and associated computing skills that are executable by a second computing device, and saving information related to those applications and/or computing skills to the first computing device. Manifest update engine 1113 may perform one or more operations associated with determining whether an application manifest is up to date with properties and/or attributes of applications and computing skills executable by a second device and updating the application manifest on a first computing device. Content transformation engine 1115 may perform one or more operations associated with transforming digital content from a first format from a first computing device to a second normalized format that is readable and/or executable by a second computing device that is going to perform an action associated with that content. Cross-platform skill execution engine 1117 may perform one or more operations associated with receiving digital content from a first computing device and executing a computing skill with an application on a second computing device in association with that digital content.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
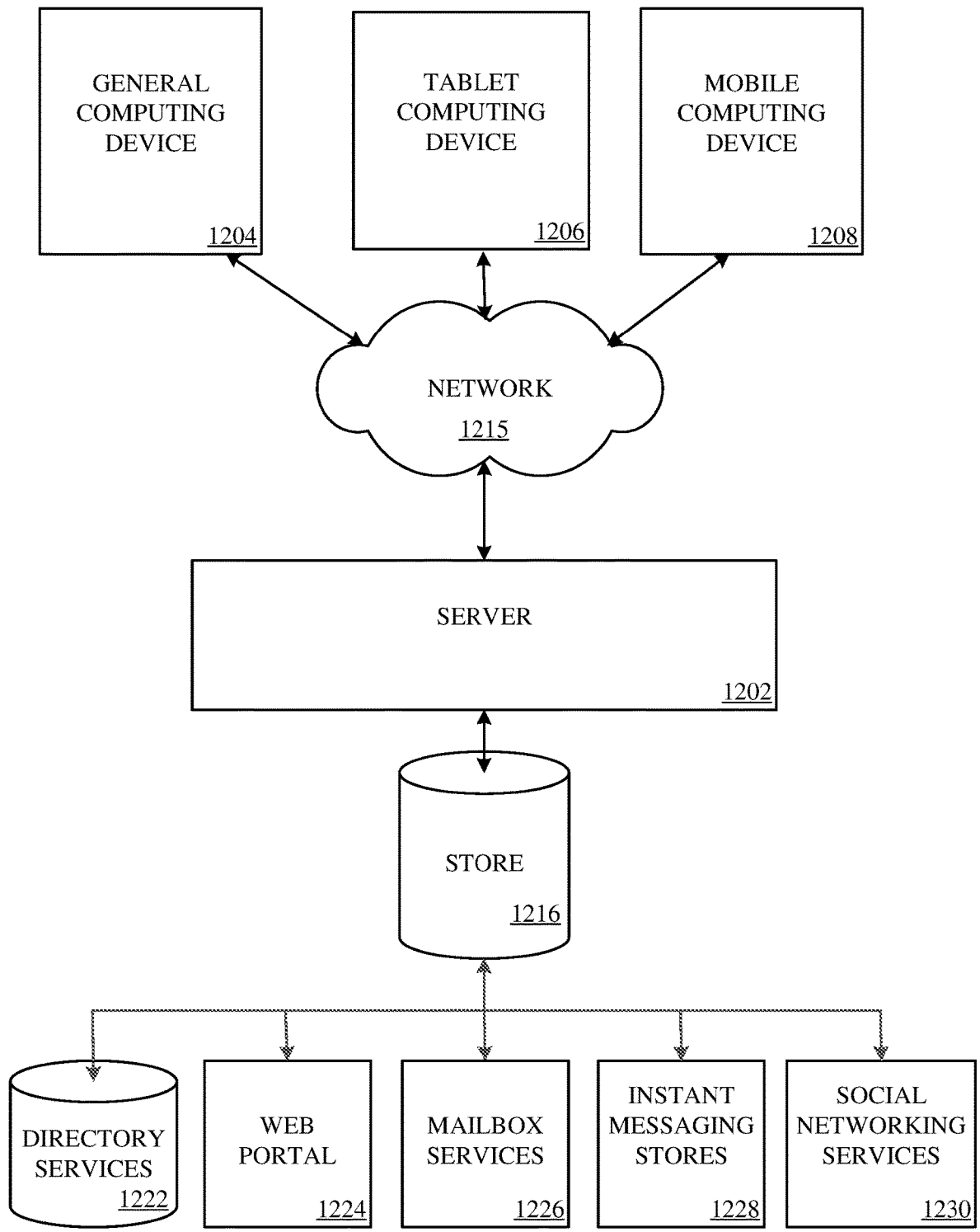
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, the computer-implemented method comprising:
    establishing, by a first computing device, a connection with a second computing device via a device mirroring application;
    receiving, on the first computing device, an indication to execute a first computing skill;
    probing, by the first computing device, an application manifest exposed by the second computing device via the device mirroring application, wherein the application manifest lists identities of applications and associated computing skills available on the second computing device, and wherein the application manifest comprises a first entry comprising an identity of the first computing skill that is executable by a second application executed by the second computing device;
    in response to identifying the first entry in the application manifest, causing a selectable option to execute the first computing skill by the second application on the second computing device to be surfaced by the first computing device;
    receiving a selection of the selectable option;
    in response to receiving the selection of the selectable option, invoking the first computing skill by a first application to cause the first computing skill to be executed by the second application on the second computing device.

2. The computer-implemented method of claim 1, wherein the first computing skill is a digital content sharing skill.

3. The computer-implemented method of claim 1, further comprising:
    determining that content related to the first computing skill on the first computing device is in a first format not executable by the second application executed by the second computing device;
    transforming the content from the first format to a second format that is executable by the second application executed by the second computing device; and
    transferring the content in the second format to the second computing device.

4. The computer-implemented method of claim 1, wherein the selectable option visually indicates that, upon selection of the selectable option, the first computing skill will be executed by the second computing device.

5. The computer-implemented method of claim 1, further comprising:
    providing by the first computing device, upon receiving the selection of the selectable option, a query to the second computing device to determine:
        whether the first computing skill is still executable by the second application executed by the second computing device; and
        whether any attributes of the first computing skill have been modified.

6. The computer-implemented method of claim 1, further comprising:
    storing, by the first computing device, the application manifest exposed by the second computing device to a local memory.

7. The computer-implemented method of claim 6, further comprising:
    requesting, by the first computing device, an updated application manifest from the second computing device; and
    updating the stored application manifest with the updated application manifest.

8. The computer-implemented method of claim 1, further comprising:
    exposing, by the first computing device via the device mirroring application, a host application manifest to the second computing device, wherein the host application manifest lists identities of applications and associated computing skills available on the first computing device.

9. The computer-implemented method of claim 1, wherein the first computing skill is executable by a third application on the first computing device, the method further comprising:
    causing a second selectable option to execute the first computing skill by the third application on the first computing device to be surfaced by the first computing device with the selectable option.

10. The computer-implemented method of claim 1, further comprising:
    causing a mirroring user interface to be surfaced by the first computing device, wherein the mirroring user interface mirrors a user interface of the second computing device.

11. The computer-implemented method of claim 1, wherein the first computing skill is a digital keyboard extension.

12. A computing device, comprising:
    one or more processors; and
    a memory having stored thereon instructions that, upon execution by the one or more processors, cause the one or more processors to:
    establish a connection with a second computing device via a device mirroring application;
    receive an indication to execute a first computing skill;
    probe an application manifest exposed by the second computing device via the device mirroring application, wherein the application manifest lists identities of applications and associated computing skills available on the second computing device, and wherein the application manifest comprises a first entry comprising an identity of the first computing skill that is executable by a second application executed by the second computing device;
    in response to identifying the first entry in the application manifest, cause a selectable option to execute the first computing skill by the second application on the second computing device to be surfaced;
    receive a selection of the selectable option;
    in response to receiving the selection of the selectable option, invoke the first computing skill in association with a first content by a first application to cause the first computing skill to be executed by the second application on the second computing device.

13. The computing device of claim 12, wherein the first computing skill is one of a digital content sharing skill and digital keyboard extension.

14. The computing device of claim 12, wherein the instructions comprise further instructions that, upon execution by the one or more processors, cause the one or more processors to:
    determine that content related to the first computing skill on the computing device is in a first format not executable by the second application executed by the second computing device;
    transform the content from the first format to a second format that is executable by the second application executed by the second computing device; and
    transfer the content in the second format to the second computing device.

15. The computing device of claim 12, wherein the selectable option visually indicates that, upon selection of the selectable option, the first computing skill will be executed by the second computing device.

16. The computing device of claim 12, wherein the instructions comprise further instructions that, upon execution by the one or more processors, cause the one or more processors to:
    provide, upon receiving the selection of the selectable option, a query to the second computing device to determine:
        whether the first computing skill is still executable by the second application executed by the second computing device; and
        whether any attributes of the first computing skill have been modified.

17. The computing device of claim 12, wherein the instructions comprise further instructions that, upon execution by the one or more processors, cause the one or more processors to:
    store the application manifest exposed by the second computing device to a local memory.

18. The computing device of claim 17, wherein the instructions comprise further instructions that, upon execution by the one or more processors, cause the one or more processors to:
    request an updated application manifest from the second computing device; and
    update the stored application manifest with the updated application manifest.

19. The computing device of claim 12, wherein the instructions comprise further instructions that, upon execution by the one or more processors, cause the one or more processors to:
    expose, via the device mirroring application, a host application manifest to the second computing device, wherein the host application manifest lists identities of applications and associated computing skills available on the computing device.

20. The computing device of claim 12, wherein the first computing skill is executable by a third application on the computing device, and wherein the instructions comprise further instructions that, upon execution by the one or more processors, cause the one or more processors to:
    cause a second selectable option to execute the first computing skill by the third application on the computing device to be surfaced with the selectable option.

* * * * *